F. LEHMAN.
SWINGLETREE HOOK.
APPLICATION FILED MAY 15, 1914.

1,210,334.

Patented Dec. 26, 1916.

Inventor
Ferdinand Lehman,
By Victor J. Evans
Attorney

Witnesses
Frederick W. Ely
Wm. Dagger

UNITED STATES PATENT OFFICE.

FERDINAND LEHMAN, OF OSSEO, MINNESOTA.

SWINGLETREE-HOOK.

1,210,334. Specification of Letters Patent. Patented Dec. 26, 1916.

Application filed May 15, 1914. Serial No. 838,824.

*To all whom it may concern:*

Be it known that I, FERDINAND LEHMAN, a citizen of the United States, residing at Osseo, in the county of Hennepin and State of Minnesota, have invented new and useful Improvements in Swingletree-Hooks, of which the following is a specification.

This invention relates to swingletree hooks, and it has for its object to produce a simple and effective device of this class which may be used in connection with tugs or traces having slots formed therein or cock-eyes connected therewith and which shall be so constructed that disassemblage of the trace from the hook shall not be likely to occur.

A further object of the invention is to so construct the improved hook device that strain upon the traces in active use will have a tendency to fasten the hook more firmly upon the swingletree, thereby preventing disassemblage of the parts.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitiation is necssarily made to the precise structural details therein exhibited, but that changes, alterations and modifications within the scope of the claim may be resorted to when desired.

Figure 1:
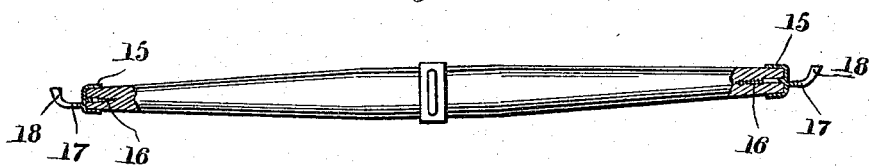
Figure 2:
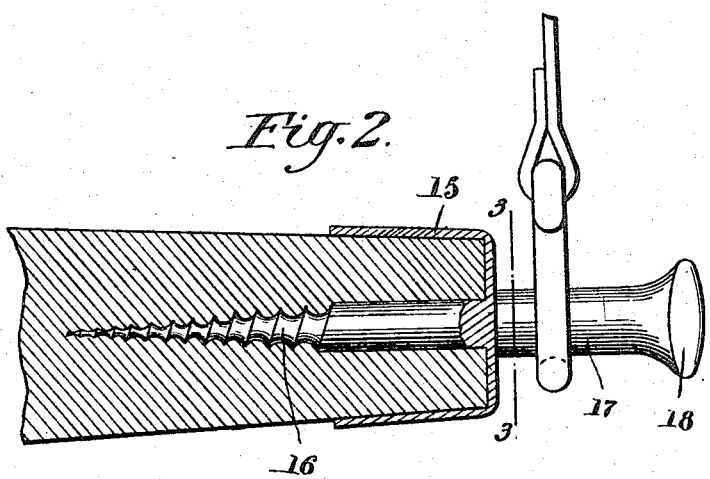
Figure 3:
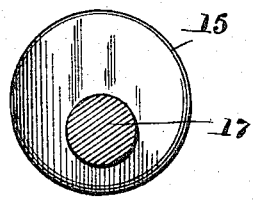

In the drawing—Figure 1 is a partly sectional rear elevation of a swingletree equipped with the improved hooks at the ends thereof. Fig. 2 is a top plan view, partly in section, of one end of the swingletree and the hook. Fig. 3 is a sectional detail view taken on the line 3—3 in Fig. 2.

Corresponding parts in the several figures are denoted by like characters of reference.

The improved device comprises a ferrule 15 having an axially disposed screw 16 located within and extending beyond the same. The head of the ferrule is provided with an eccentrically disposed shank 17, the free end of which is bent to form a hook 18 having a relatively broad and flat head, as shown. In practice, one of these devices is applied to each end of a swingletree, and it will be observed that the screws 16 are, respectively, right and left threaded, the threads being of respectively coarse pitch. The ends of the swingletree which receive these screws are entered into the ferrules 15, the screws being tightened until the hook carrying shanks 17 are disposed in the vertical planes of the axes of the screws below the latter, as clearly seen in Figs. 1 and 3. The parts are, furthermore, assembled in such fashion that when forward draft is exerted on the eccentrically disposed shafts 17, the tendency of the latter will be to further rotate the ferrules, thereby causing the screws to enter farther into the ends of the swingletree, thus tightening the parts.

Having thus described the invention what is claimed as new, is:—

In a device of the class described, in combination, a swingletree, a ferrule surrounding one end of said swingletree and having an axially-disposed screw projecting into the swingletree, an integral angular shank having its inner end formed upon the ferrule at a point below the center and below said screw, said shank having its outer end in the form of a hook gradually flaring and widening toward its outer end so as to form a relatively broad and flat head.

In testimony whereof I affix my signature in presence of two witnesses.

FERDINAND LEHMAN.

Witnesses:
D. G. CAMPBELL,
E. E. ERICSON.

Copies of this patent may be obtained for five cents each, by addressing the "Commissioner of Patents, Washington, D. C."